United States Patent
Ruona et al.

(10) Patent No.: US 8,683,786 B2
(45) Date of Patent: *Apr. 1, 2014

(54) GASOLINE PARTICULATE FILTER REGENERATION AND DIAGNOSTICS

(75) Inventors: William Charles Ruona, Farmington Hills, MI (US); Michiel J. Van Nieuwstadt, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 19 days.

This patent is subject to a terminal disclaimer.

(21) Appl. No.: 13/615,278

(22) Filed: Sep. 13, 2012

(65) Prior Publication Data

US 2013/0008162 A1 Jan. 10, 2013

Related U.S. Application Data

(63) Continuation of application No. 12/689,930, filed on Jan. 19, 2010, now Pat. No. 8,327,628.

(60) Provisional application No. 61/246,930, filed on Sep. 29, 2009.

(51) Int. Cl.
*F01N 3/00* (2006.01)

(52) U.S. Cl.
USPC ................ 60/295; 60/286; 60/304; 60/305; 60/306; 60/311

(58) Field of Classification Search
USPC ................ 60/295, 286, 304, 305, 306, 311
See application file for complete search history.

(56) References Cited

U.S. PATENT DOCUMENTS

| 5,462,039 | A  | * | 10/1995 | Mamiya et al. ............... 123/686 |
| 5,685,285 | A  | * | 11/1997 | Ohtani et al. ................. 123/698 |
| 5,974,792 | A  | * | 11/1999 | Isobe ............................... 60/278 |
| 7,299,626 | B2 | * | 11/2007 | Barasa et al. .................. 60/297 |
| 7,500,354 | B2 | * | 3/2009  | Pohmerer et al. .............. 60/285 |
| 7,963,101 | B2 | * | 6/2011  | Suzuki et al. .................. 60/285 |
| 8,136,343 | B2 | * | 3/2012  | Zawacki et al. ................ 60/276 |
| 8,136,505 | B2 |   | 3/2012  | Ruhland et al. |
| 8,173,087 | B2 | * | 5/2012  | Wei et al. .................... 423/213.2 |
| 8,181,445 | B2 | * | 5/2012  | Duvinage et al. .............. 60/286 |
| 8,181,452 | B2 | * | 5/2012  | Bidner et al. .................. 60/295 |
| 2002/0155039 | A1 |   | 10/2002 | Itoh et al. |
| 2006/0070373 | A1 | * | 4/2006  | Huang et al. .................. 60/286 |
| 2006/0080959 | A1 | * | 4/2006  | Ruiz et al. ...................... 60/603 |
| 2007/0101701 | A1 | * | 5/2007  | Acke et al. .................... 60/286 |

(Continued)

FOREIGN PATENT DOCUMENTS

| EP | 1300558  | A1 | * | 4/2003  | ............. F02B 33/32 |
| FR | 2862704  | A1 | * | 5/2005  | ............. F01N 3/18 |
| JP | 2005226507 | A | * | 8/2005 | ............. F02D 21/08 |
| JP | 2006307801 | A | * | 11/2006 | |

*Primary Examiner* — Thomas Denion
*Assistant Examiner* — Patrick Maines
(74) *Attorney, Agent, or Firm* — Julia Voutyras; Alleman Hall McCoy Russell & Tuttle LLP

(57) ABSTRACT

A method for operating a spark-ignition engine having a three-way catalyst and a particulate filter downstream thereof, comprising: oscillating an exhaust air-fuel ratio entering the particulate filter to generate air-fuel ratio oscillations downstream of the particulate filter, while increasing exhaust temperature; when the downstream oscillations are sufficiently dissipated, enleaning the exhaust air-fuel ratio entering the particulate filter; and reducing the enleanment when an exhaust operating parameter is beyond a threshold amount.

17 Claims, 12 Drawing Sheets

(56) References Cited

U.S. PATENT DOCUMENTS

| | | | |
|---|---|---|---|
| 2007/0144148 A1* | 6/2007 | Colignon | 60/286 |
| 2008/0134648 A1* | 6/2008 | Duvinags et al. | 55/282.2 |
| 2008/0148715 A1* | 6/2008 | Osumi et al. | 60/295 |
| 2009/0120070 A1* | 5/2009 | Hirata et al. | 60/286 |
| 2009/0120071 A1 | 5/2009 | Gandhi et al. | |
| 2009/0199547 A1* | 8/2009 | Li et al. | 60/299 |
| 2009/0199947 A1* | 8/2009 | Bianchi et al. | 156/60 |
| 2010/0011749 A1* | 1/2010 | Fujiwara et al. | 60/286 |
| 2010/0192543 A1* | 8/2010 | Fujiwara et al. | 60/276 |
| 2011/0047978 A1 | 3/2011 | Zawacki et al. | |
| 2011/0048106 A1 | 3/2011 | Zawacki et al. | |
| 2011/0072783 A1* | 3/2011 | Hepburn et al. | 60/274 |
| 2011/0072784 A1* | 3/2011 | Hepburn et al. | 60/274 |
| 2011/0072787 A1* | 3/2011 | Hubbard et al. | 60/276 |
| 2011/0072791 A1 | 3/2011 | Bidner et al. | |
| 2011/0072793 A1 | 3/2011 | Bidner et al. | |
| 2011/0072794 A1 | 3/2011 | Van Nieuwstadt et al. | |
| 2011/0072795 A1 | 3/2011 | Kerns et al. | |
| 2011/0072796 A1 | 3/2011 | Van Nieuwstadt | |
| 2011/0072797 A1 | 3/2011 | Van Nieuwstadt | |
| 2011/0072799 A1 | 3/2011 | Bidner et al. | |
| 2011/0072800 A1 | 3/2011 | Bidner et al. | |
| 2011/0072801 A1 | 3/2011 | Lupescu et al. | |
| 2011/0072802 A1 | 3/2011 | Bidner et al. | |
| 2011/0072803 A1 | 3/2011 | Van Nieuwstadt et al. | |
| 2011/0072804 A1 | 3/2011 | Van Nieuwstadt et al. | |
| 2011/0073088 A1* | 3/2011 | Hubbard et al. | 123/703 |

* cited by examiner

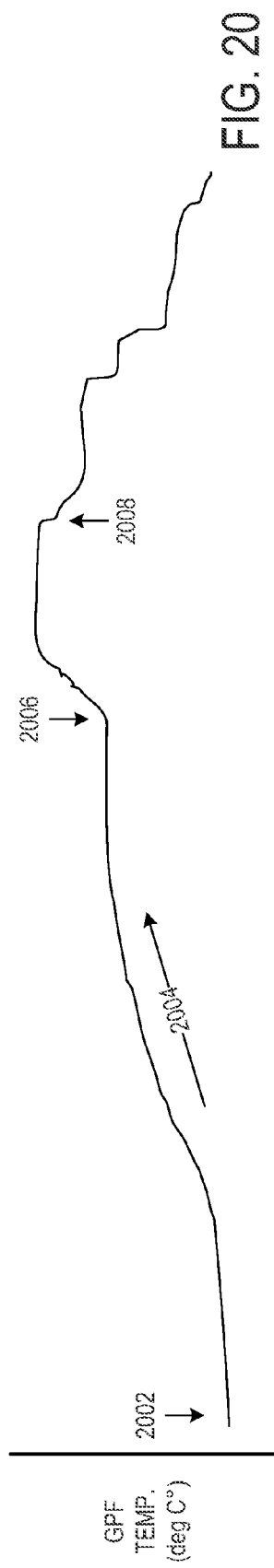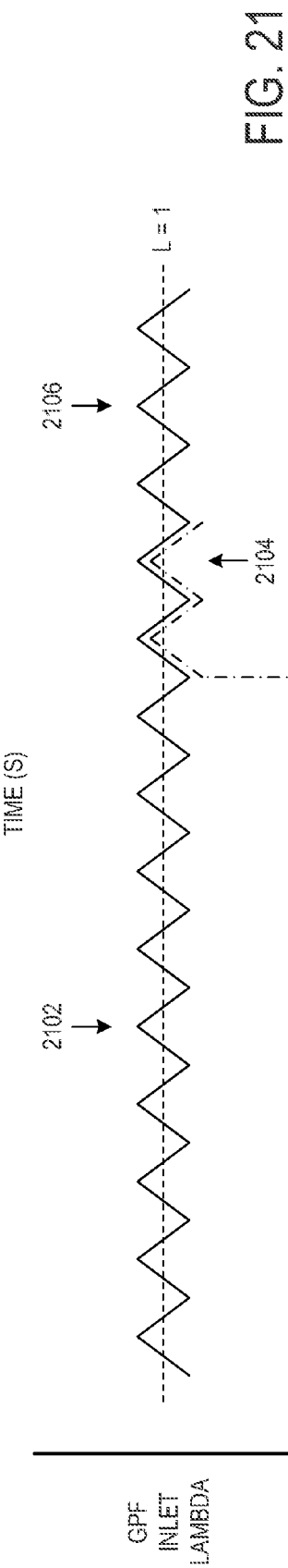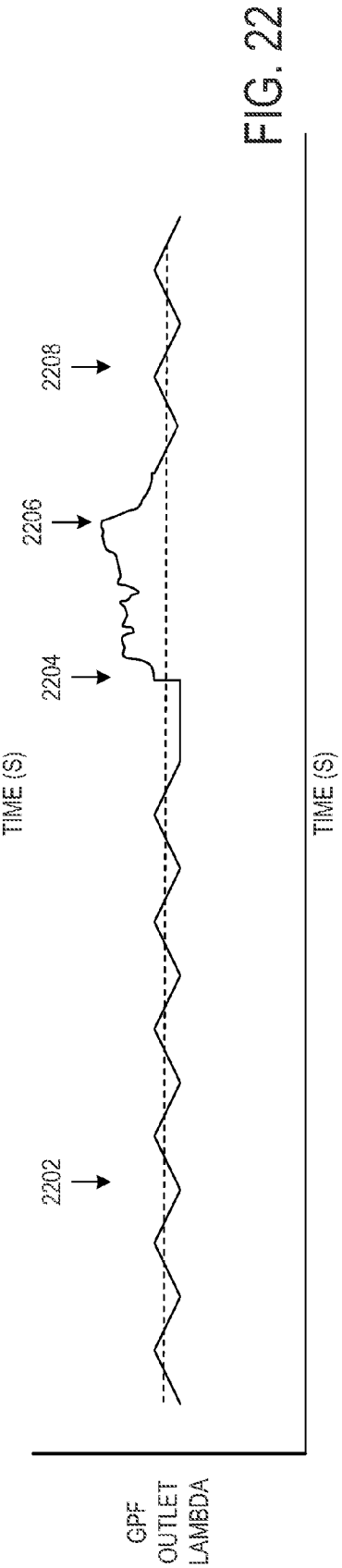

GASOLINE PARTICULATE FILTER REGENERATION AND DIAGNOSTICS

CROSS-REFERENCE TO RELATED APPLICATION

This application claims priority to U.S. Provisional Patent Application Ser. No. 61/246,930, entitled "GASOLINE PARTICULATE FILTER REGENERATION AND DIAGNOSTICS," filed Sep. 29, 2009, the disclosure of which is hereby incorporated by reference in its entirety and for all purposes.

BACKGROUND AND SUMMARY

Recently, direct injection gasoline engines have been shown to improve engine performance and to reduce transient air-fuel disturbances that may be caused by fuel adhering to the intake manifold and ports of an engine. However, at higher engine speeds and higher engine loads, particulates may form in engine exhaust. Under some conditions, formation of the particulates may be related to the short amount of time between when fuel is injected to the cylinder and when combustion is initiated by a spark plug. Specifically, there may be only a short opportunity for the injected fuel to vaporize and form a homogenous mixture before combustion is initiated. If a homogenous air-fuel mixture is not formed in the cylinder before combustion is initiated, pockets of stratification may form, and soot may be produced by combusting rich areas within the cylinder air-fuel mixture. Particulate filters have been proposed as one way to reduce emissions of soot.

The inventors herein have developed a method for regenerating a particulate filter. In particular the inventors have developed a method for operating a spark-ignition engine having a three-way catalyst and a particulate filter downstream thereof, comprising: oscillating an exhaust air-fuel ratio entering the particulate filter to generate air-fuel ratio oscillations downstream of the particulate filter, while increasing exhaust temperature; when the downstream oscillations are sufficiently dissipated, enleaning the exhaust air-fuel ratio entering the particulate filter; and reducing the enleanment when an operating parameter is beyond a threshold amount.

By monitoring the air-fuel ratio downstream of the particulate filter for changes in exhaust air-fuel oscillations, suitable conditions for particulate filter regeneration may be identified. In particular, dissipation of the oscillations indicates oxidation of soot in the particulate filter. As such, enleanment of the exhaust air-fuel ratio may be accurately and timely performed to regenerate the particulate filter. For example, enleanment may be performed by introducing fresh air between the three-way catalyst and the particulate filter. Correspondingly, when an operating parameter is beyond a threshold amount indicating that the soot load has been oxidized, the enleanment may be reduced. For example, the introduction of fresh air may be reduced or stopped. In this way, changes in air-fuel downstream of the particulate filter may be leveraged to accurately enlean the exhaust entering the particulate filter to improve regeneration efficiency and reduce regeneration time.

As another example, the inventors have developed an engine system including: an engine configured to combust air and at least one of gasoline and alcohol; an exhaust system configured to receive exhaust from the engine, the exhaust system comprising: an emissions control device; a particulate filter positioned downstream from the emissions control device; an oxygen sensor positioned downstream from the particulate filter; and a temperature sensor configured to provide a temperature of the particulate filter; and a controller configured to, during regeneration of the particulate filter, increase a temperature of the particulate filter, and in response to a temperature of the particulate filter provided from the temperature sensor being greater than a temperature threshold and a time that a lambda of the oxygen sensor is biased rich is greater than a time threshold, introduce secondary air to a location downstream from the emissions control device and upstream from the particulate filter.

By monitoring changes in temperature of a particulate filter as well as changes of an oxygen sensor lambda downstream of the particulate filter, secondary air may be introduced between an upstream emissions control device and the particulate filter in an accurate manner to aid in regeneration of the particulate filter without disturbing the processing of engine exhaust gases in the upstream emissions control device. Accurate introduction of secondary air may increase the oxidation rate of soot in the particulate filter. In this way, particulate filter regeneration efficiency may be improved and regeneration time may be reduced. Moreover, the air-fuel control of the engine may be may be oscillated between lean and rich so that the emissions control device may process engine exhaust during particulate filter regeneration.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein:

FIG. 20 is a graph of a gasoline particulate filter temperature vs. time.

FIG. 21 is a graph of a gasoline particulate filter inlet air-fuel ratio vs. time.

FIG. 22 is a graph of a gasoline particulate filter outlet air-fuel ratio vs. time.

DETAILED DESCRIPTION

Figure 1:
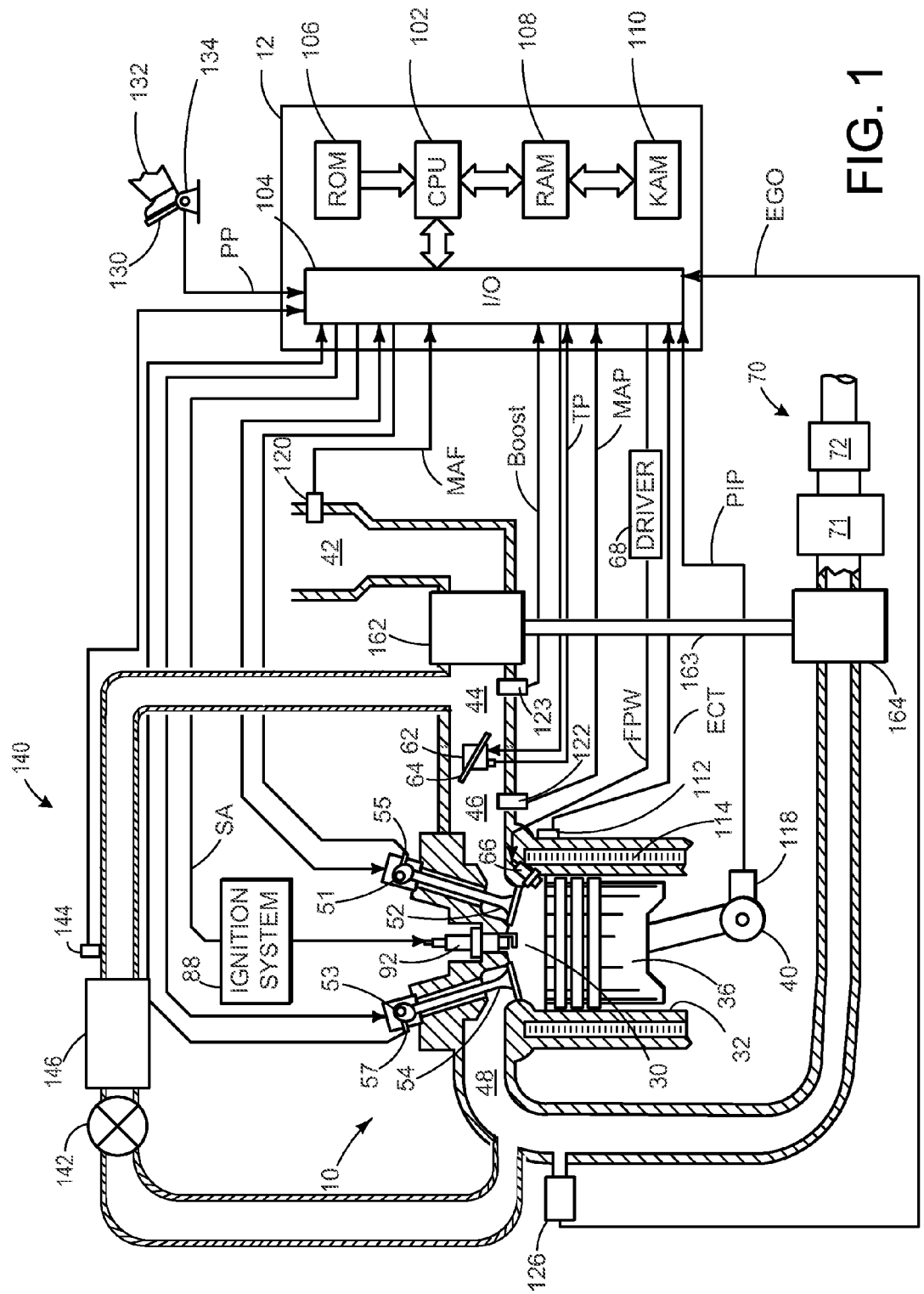
FIG. 1 is a schematic diagram of an embodiment of one cylinder of a multi-cylinder engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30. Fuel injector 66 may inject any suitable fuel that includes gasoline, alcohol, or a combination thereof. In some embodiments, engine 10 may include a plurality of fuel injectors that inject the same or different types of fuel.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark. Under some operating conditions, ignition system 88 may provide spark to combust a mixture of air and gasoline to perform spark ignition combustion at stoichiometry.

Exhaust gas sensor 126 is shown coupled to exhaust manifold 48 upstream of emission control system 70 which may include emissions control device 71 and gasoline particulate filter (GPF) 72. Sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOx, HC, or CO sensor.

Emissions control device 71 is shown arranged along exhaust manifold 48 downstream of exhaust gas sensor 126. For example, emissions control device 71 may include a three way catalyst (TWC), a hydrocarbon or NOx trap, various other emissions control devices, or combinations thereof. Further, GPF 72 may include a particulate filter, hydrocarbon trap, a catalyzed wash coat, or combination thereof. In some embodiments, during operation of engine 10, emissions control device 71 may be periodically reset by operating at least one cylinder of the engine within a particular air-fuel ratio. For example, the air-fuel ratio may be oscillated between lean and rich. In some embodiments, during operation of engine 10, GPF 72 may be periodically regenerated by operating at least one cylinder of the engine within a particular air-fuel ratio to increase the temperature of GPF 72 so that retained hydrocarbons and soot particulates may be oxidized.

Further, in the disclosed embodiments, an exhaust gas recirculation (EGR) system may route a desired portion of exhaust gas from exhaust manifold 48 to intake passage 42 via EGR passage 140. The amount of EGR provided to intake passage 44 may be varied by controller 12 via EGR valve 142. EGR passage may include an intercooler 146 through which exhaust gas may pass through to decrease the exhaust gas temperature and increase air charge density for combustion in engine 10. Further, an EGR sensor 144 may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

Engine 10 may further include a compression device such as a turbocharger or supercharger including at least a compressor 162 arranged along intake manifold 44. For a turbocharger, compressor 162 may be at least partially driven by a turbine 164, for example via shaft 163, arranged along exhaust manifold 48. For a supercharger, compressor 162 may be at least partially driven by the engine and/or an electric machine, and may not include a turbine. Intake manifold 44 may include a pressure sensor 123 positioned downstream of compressor 162 and upstream of throttle 62 for providing an indication boosted air pressure from the compression device in the form of a Boost signal to controller 12. Thus, the amount of compression provided to one or more cylinders of the engine via a turbocharger or supercharger may be varied by controller 12.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
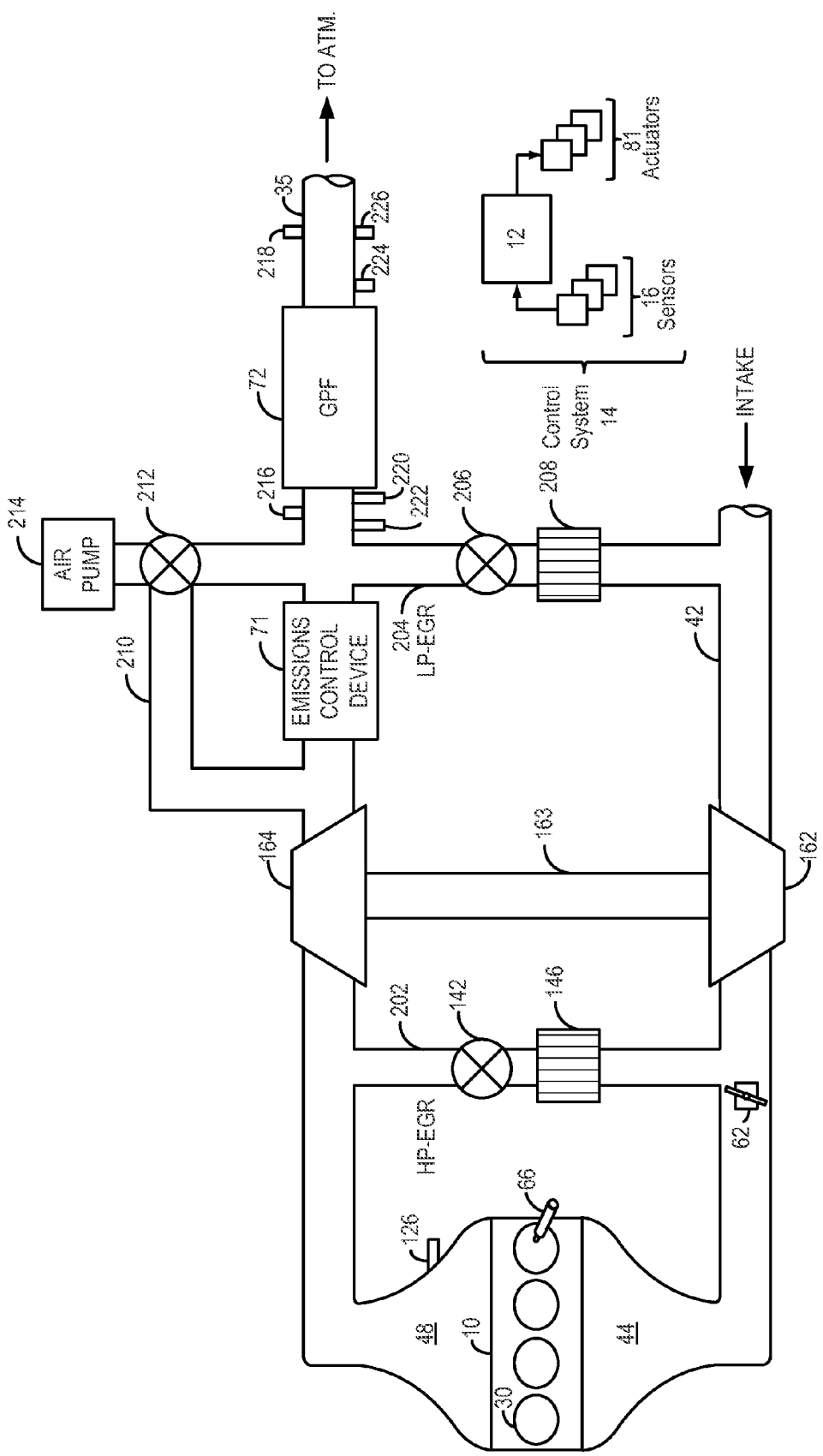
FIG. 2 is a schematic diagram of an embodiment of an intake and exhaust system of an engine.

FIG. 2 is a schematic diagram showing an intake and exhaust system for an engine 10 that may be implemented in a propulsion system of a vehicle. Components of the intake and exhaust system may be substantially the same as those of engine 10 shown in FIG. 1 and are identified in the same way and are described no further. However, it will be noted that components identified in the same way in different embodiments of the present disclosure may be at least partly different.

Engine 10 may include an exhaust gas recirculation (EGR) system to help lower $NO_x$ and other emissions. For example, engine 10 may include a high pressure EGR system in which exhaust gas is delivered to intake manifold 44 by a high pressure EGR passage 202 in fluid communication with exhaust manifold 48 at a location upstream of an exhaust turbine 164 of a compression device, and in fluid communication with intake manifold 44 at a location downstream of an intake compressor 162 of the compression device. The depicted high pressure EGR system includes high pressure EGR valve assembly 142 located in high pressure EGR passage 202. Exhaust gas travels from exhaust manifold 48 first through high pressure EGR valve assembly 142, and then to intake manifold 44. An EGR cooler 146 may be located in high pressure EGR passage 202 to cool recirculated exhaust gases before entering the intake manifold. Cooling is typically done using engine water, but an air-to-air heat exchanger may also be used.

Engine 10 may also include a low pressure EGR system. The depicted low pressure EGR system includes a low pressure EGR passage 204 in fluid communication with exhaust manifold 48 at a location downstream of exhaust turbine 164, and in fluid communication with intake manifold 44 at a location upstream of intake compressor 162. A low pressure valve assembly 206 is located in low pressure EGR passage 204. Exhaust gas in the low pressure EGR loop travels from turbine 164 through a emissions control device 71 (for example, a three-way catalyst that may have a wash coat comprising platinum, palladium, and Rhodium) before entering low pressure EGR passage 204. Catalytic device 71 processes engine exhaust gases to oxidize exhaust gas constituents, for example. A low pressure EGR cooler 208 may be positioned along low pressure EGR passage 204.

GPF 72 retains residual soot and other hydrocarbons exhausted from engine 10 in order to lower emissions. The retained particulates may be oxidized to produce CO2 in a forced regeneration process that is performed during engine operation. The GPF regeneration process may be performed to reduce the soot load retained in the GPF. GPF regeneration may be performed at high GPF temperatures (e.g., 600° C. and above) so that the retained particulates are combusted in a quick manner and are not released to the atmosphere. To speed up the regeneration process and oxidize the soot in an efficient manner exhaust gas entering the particulate filter may be enleaned. For example, oxygen rich air may be introduced to the inlet of GPF 72 to enlean the air-fuel ratio. The gasoline particulate filter regeneration process will be discussed in further detail below with reference to FIGS. 7-12. GPF 72 may communicate with exhaust manifold 48 at a location downstream of emissions control device 71.

Exhaust entering GPF 72 may be enleaned for regeneration in one or more different ways. Air pump 214 is positioned upstream from GPF 72 and may be operated to introduce fresh air to GPF 72 for regeneration. GPF 72 may be supplied with pressurized air via high pressure EGR passage 202 via bypass passage 210. Bypass passage 210 may be used to divert air around emissions control device 71 under some conditions so as not to interrupt operation of emissions control device 71 by loading it with oxygen. Bypass passage 210 may include a bypass valve 212 that may be controlled by controller 12 to allow the pressurize air to bypass emission control device 71 and enter GPF 72. Bypass valve 212 may be a three-way valve and may control the amount of air provided to GPF 72 from bypass passage 210, air pump 214, or a combination thereof.

Furthermore, under some conditions, air may be provided to the inlet of GPF 72 via low pressure EGR passage 204 via operation of low pressure EGR valve assembly 206. In particular, under conditions where the pressure of the inlet of GPF 72 is lower than the pressure of intake passage 42 air may be introduced to GPF 72 for regeneration. Under some conditions, RAM air may be used to direct secondary air to be introduced to the inlet of GPF 72 via low pressure EGR passage 204. Further, gases from the intake system may be provided from upstream of a throttle body or from downstream of a throttle body depending on system configuration. If desired, exhaust gases may be drawn from the exhaust passage between emissions control device 71 and GPF 72 to the intake manifold during conditions when the engine is operating and when intake manifold is at a lower pressure than the exhaust system pressure between emissions control device 71 and GPF 72.

High pressure EGR valve assembly 142 and low pressure EGR valve assembly 206 each has a valve for controlling a variable area restriction in high pressure EGR passage 202 and low pressure EGR passage 204, which thereby controls flow of high and low pressure EGR, respectively. In some embodiments, high pressure EGR valve assembly 142 and low pressure EGR valve assembly 206 are vacuum actuated valves. However, any type of flow control valve or valves may be used such as, for example, an electrical solenoid powered valve or a stepper motor powered valve. Actuation of high pressure EGR valve assembly 142 and low pressure EGR valve assembly 206 may be controlled by controller 12 based on information provided by sensors 16.

Concentration of oxygen present in the exhaust system may be assessed by oxygen (O2) sensors 126, 216 and 218. Oxygen sensor 126 is positioned upstream of emissions control device 71 and senses engine feed-gas oxygen concentration. Oxygen sensor 216 is positioned between emissions control device 71 and GPF 72 and senses GPF inlet oxygen concentration. Oxygen sensor 218 is positioned downstream of GPF 72 and senses exhaust gas oxygen post-catalyst. Oxygen sensors 126, 216, and 218 may be wide range sensors having a linearized output or they may be sensors that indicate a high gain signal near stoichiometric conditions.

Temperature in the exhaust system may be assessed by temperature sensors 222 and 224. Temperature sensor 222 may be positioned upstream from the inlet of GPF 72 and temperature sensor 224 may be positioned downstream of GPF 72. Temperature sensors 222 and 224 may be used to assess the temperature of GPF 72 for regeneration purposes.

Pressure in the exhaust system may be assessed by pressure sensor 220. Pressure sensor 220 may be a differential pressure sensor positioned upstream and downstream of GPF 72. Pressure sensor 220 may be used to determine pressure at the inlet of GPF 72 in order to assess operating conditions for air to be introduced to the inlet of GPF 72 for regeneration.

Soot sensor 226 may be positioned downstream of GPF 72 to assess the level of soot that is released from GPF 72. Soot sensor 226 may be used to diagnose operation of GPF 72 among other functions.

Control system 14 may include sensors 16 that send signals to controller 12, including the above described sensors. Further, controller 12 may send signals to actuators 81 to control operation of engine 10 as well as components of the intake and exhaust system including the above described valves.

In some embodiments, one or more additional sensors may be positioned in the intake and exhaust system. For example, an additional pressure sensor may be positioned upstream of emissions control device 71. In some embodiments, one or more sensors may be omitted from the intake or exhaust system. For example, in some embodiments, oxygen sensor 216 may be omitted from the intake and exhaust system, so that there is only an oxygen sensor positioned upstream of the feed-gas emissions control device and an oxygen sensor positioned downstream from the GPF. It will be understood that the depicted engine 10 is shown only for the purpose of example and that the systems and methods described herein may be implemented in or applied to any other suitable engine having any suitable components and/or arrangement of components.

Figure 3:
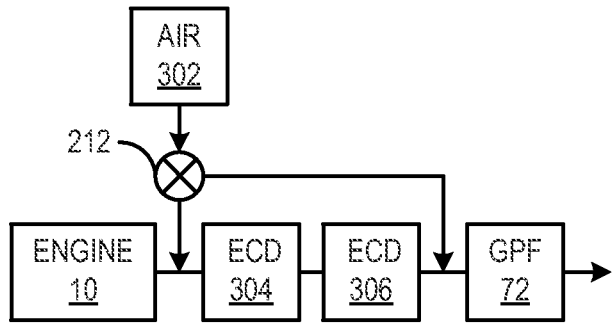
FIG. 3 is another embodiment of an exhaust system of an engine.

FIG. 3 shows another embodiment of an exhaust system of an engine. In the illustrated embodiment, during regeneration of GPF 72, fresh air or a lean air-fuel mixture may bypass emission control device 304 and emissions control device 306 and be supplied to the inlet of GPF 72 so as not to disrupt operation of the emissions control devices. Fresh air may be supplied to GPF 72 by air source 302 (e.g., air pump) and/or a lean air-fuel mixture may be directed from engine 10 based on operation of bypass valve 212.

Figure 4:
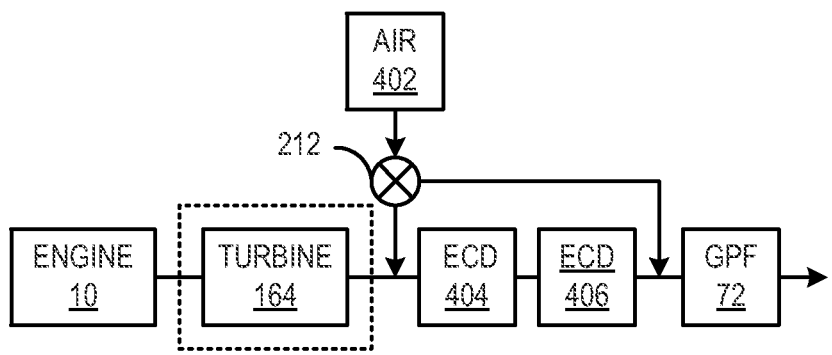
FIG. 4 is another embodiment of an exhaust system of an engine.

FIG. 4 shows another embodiment of an exhaust system of an engine. In the illustrated embodiment, GPF 72 may receive pressurized air for regeneration from turbine 164 via operation of bypass valve 212. The air may travel from turbine 164 through bypass valve 212 to the inlet of GPF 72 without traveling through emissions control device 404 and emissions control device 406. Instead or in addition, air source 402 may supply fresh air that may be directed to GPF 72 based on operation of bypass valve 212.

Figure 5:
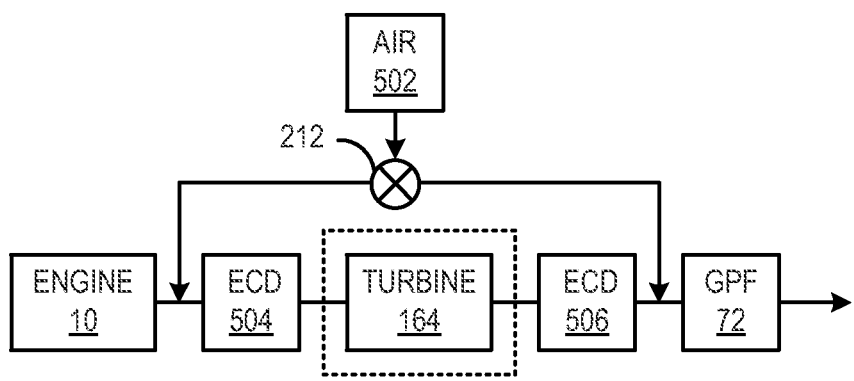
FIG. 5 is another embodiment of an exhaust system of an engine.

FIG. 5 shows another embodiment of an exhaust system of an engine. In the illustrated embodiment, a lean air-fuel mixture may be supplied to GPF 72 from engine 10 while bypassing emissions control device 504, turbine 164, and emissions control device 506. Instead or in addition, air source 402 may supply fresh air to GPF 72 based on operation of bypass valve 212. In some embodiments, emissions control device 504 may be omitted.

Figure 6:
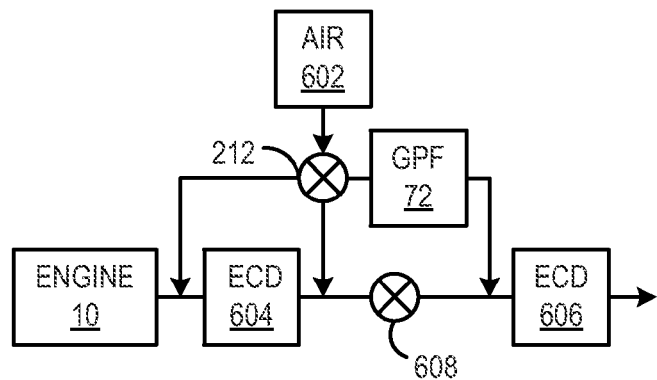
FIG. 6 is another embodiment of an exhaust system of an engine.

FIG. 6 shows another embodiment of an exhaust system of an engine. In the illustrated embodiment, GPF 72 may be positioned in parallel with emissions control device 604 and upstream of emissions control device 606. In some embodiments, GPF 72 may include a hydrocarbon trap. A lean air-fuel mixture may be supplied to GPF 72 from engine 10 while bypassing emissions control device 604 based on operation of bypass valve 212 and/or downstream valve 608. Instead or in addition, air source 602 may supply fresh air to GPF 72 based on operation of bypass valve 212.

Figure 7:
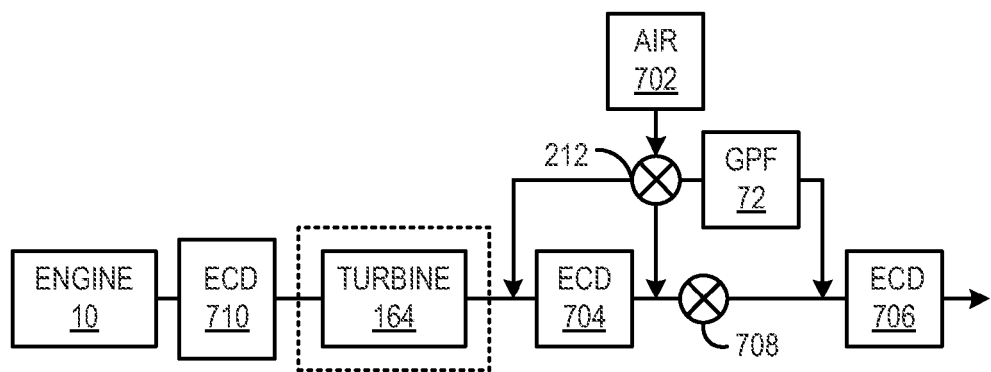
FIG. 7 is another embodiment of an exhaust system of an engine.

FIG. 7 shows another embodiment of an exhaust system of an engine. In the illustrated embodiment, GPF 72 may be positioned in parallel with emissions control device 704 and upstream of emissions control device 706. In some embodiments, GPF 72 may include a hydrocarbon trap. A lean air-fuel mixture may be supplied to GPF 72 from the outlet of turbine 164 while bypassing emissions control device 704 based on operation of bypass valve 212 and/or downstream valve 708. Instead or in addition, air source 702 may supply fresh air to GPF 72 based on operation of bypass valve 212 and/or downstream valve 708. In some embodiments, emissions control device 710 may be omitted.

Figure 8:
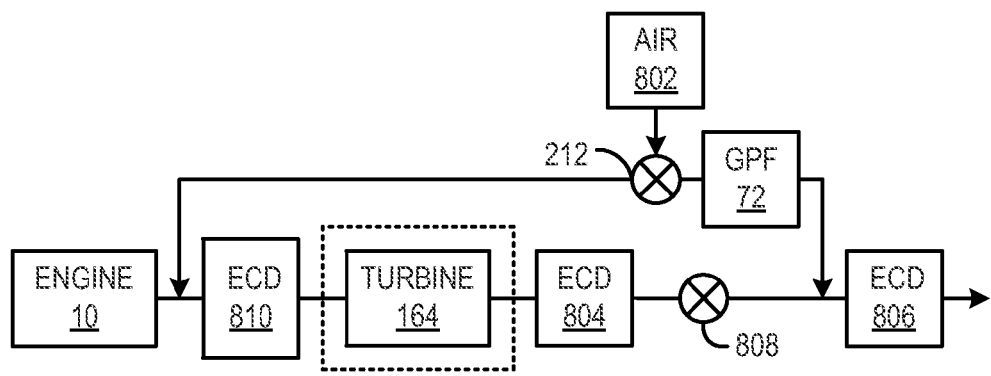
FIG. 8 is another embodiment of an exhaust system of an engine.

FIG. 8 shows another embodiment of an exhaust system of an engine. In the illustrated embodiment, GPF 72 may be positioned in parallel with emissions control device 810, turbine 164 and emissions control device 804, and upstream of emissions control device 806. A lean air-fuel mixture may be supplied from engine 10 to GPF 72 while bypassing emissions control device 810, turbine 164, and emissions control device 804 based on operation of bypass valve 212 and/or downstream valve 808. Instead or in addition, air source 802 may supply fresh air to GPF 72 based on operation of bypass valve 212 and/or downstream valve 808. In some embodiments, emissions control device 810 may be omitted.

Figure 9:
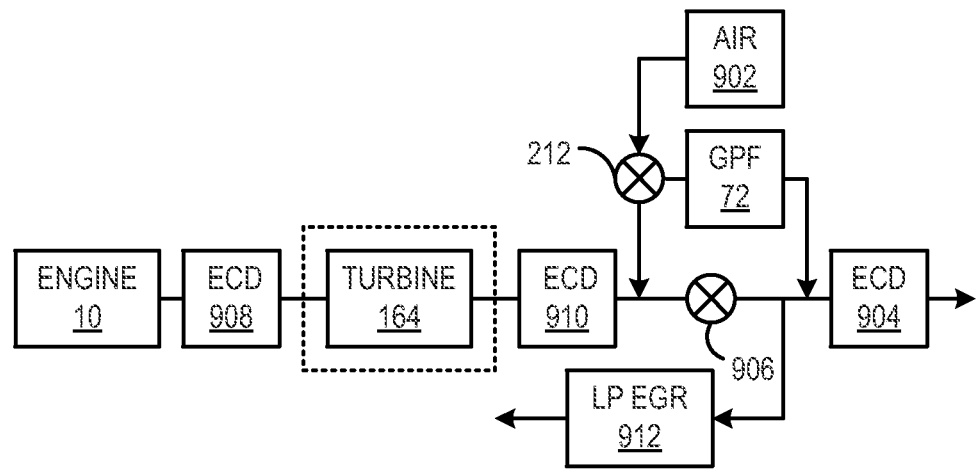
FIG. 9 is another embodiment of an exhaust system of an engine.

FIG. 9 shows another embodiment of an exhaust system of an engine. In the illustrated embodiment, GPF 72 is positioned downstream of emissions control device 908, turbine 164, and emissions control device 910 and upstream of emissions control device 904. Exhaust may be optionally directed through GPF 72 for treatment based on operation of bypass valve 212 and downstream valve 906. During regeneration, air source 902 may supply fresh air to the inlet of GPF 72 based on operation of bypass valve 212. Furthermore, the exhaust system includes a low pressure EGR passage 912. Under some conditions, air may be introduced to GPF 72 via low pressure EGR passage 912. Valves 212 and 906 may be operated in conjunction to direct air from low pressure EGR passage 912 to the inlet of GPF 72. For example, when positive intake manifold pressure exists, air may be directed through low pressure EGR passage 912 to GPF 72.

Figure 10:
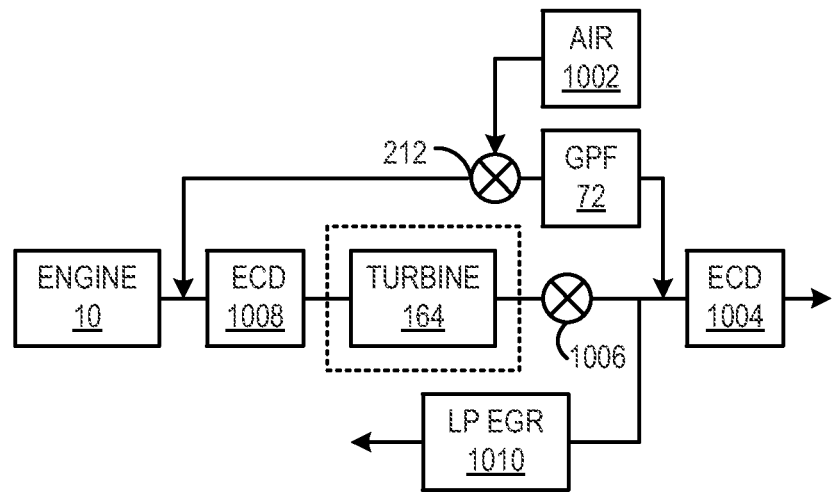
FIG. 10 is another embodiment of an exhaust system of an engine.

FIG. 10 shows another embodiment of an exhaust system of an engine. In the illustrated embodiment, GPF 72 is positioned in parallel with emissions control device 1008 and turbine 164 and upstream of emissions control device 1004. Exhaust gas may be optionally directed through GPF 72 for treatment based on operation of bypass valve 212 and downstream valve 1006. During regeneration, air source 1002 may supply fresh air to the inlet of GPF 72 based on operation of bypass valve 212. Furthermore, the exhaust system includes a low pressure EGR passage 1010. Under some conditions, air may be introduced to GPF 72 via low pressure EGR passage 1010. Valves 212 and 1006 may be operated in conjunction to direct air from low pressure EGR passage 1010 to the inlet of GPF 72. For example, when positive intake manifold pressure exists, air may be directed through low pressure EGR passage 1010 to the inlet of GPF 72. In preferred embodiments, the exhaust systems of FIGS. 9 and 10 may be employed for after treatment of an inline cylinder type engine, such as an I3, I4, I5, or I6, for example.

Figure 11:
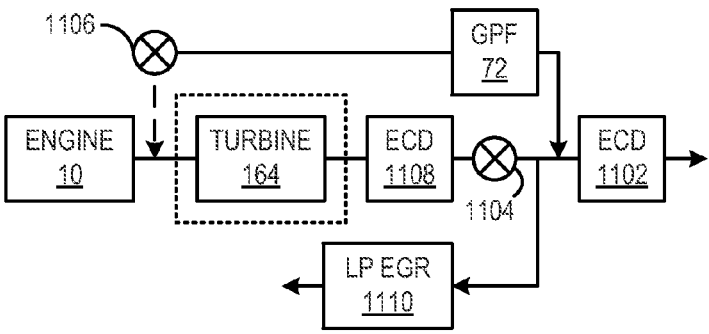
FIG. 11 is another embodiment of an exhaust system of an engine.

FIG. 11 shows another embodiment of an exhaust system of an engine. In the illustrated embodiment, GPF 72 is positioned in parallel with turbine 164 and emissions control device 1108 and upstream from emissions control device 1102. In some embodiments, GPF 72 may include a hydrocarbon trap. A lean air-fuel mixture may be supplied from engine 10 to GPF 72 while bypassing turbine 164, and emissions control device 1108 based on operation of bypass valve 1106 and/or downstream valve 1104. In some embodiments, bypass valve 1106 includes a waste gate of a turbocharger that includes turbine 164. The waste gate may be opened during some conditions to direct a lean air-fuel mixture to the inlet of GPF 72. For example, the waste gate may be active during cold start conditions. Further, the engine system includes a low pressure EGR passage 1110. Under some conditions, air may be introduced to GPF 72 via low pressure EGR passage 1110. For example, when positive intake manifold pressure exists, air may be directed through low pressure EGR passage 1110 to GPF 72.

Figure 12:
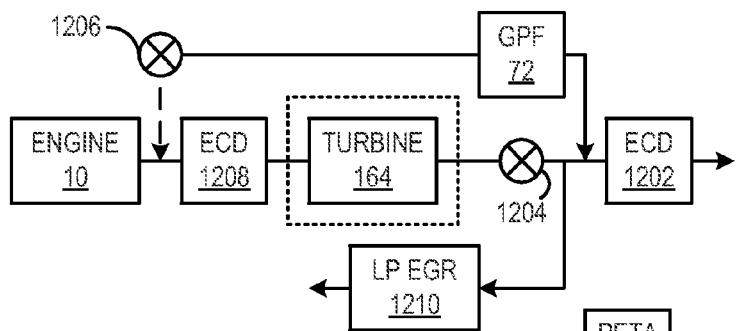
FIG. 12 is another embodiment of an exhaust system of an engine.

FIG. 12 shows another embodiment of an exhaust system of an engine that is configured similar to the exhaust system of FIG. 11, except emissions control device 1208 is positioned upstream from turbine 164 instead of downstream. The other illustrated elements function in a similar or the same manner as the configuration of FIG. 11 and will not be discussed in further detail.

Figure 13:
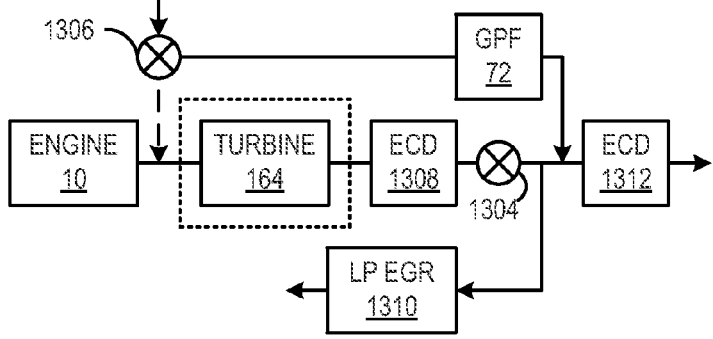
FIG. 13 is another embodiment of an exhaust system of an engine.

FIG. 13 shows another embodiment of an exhaust system of an engine that is configured similar to the exhaust system of FIG. 11. This embodiment further includes an electric thermactor air (ETA) system 1302 that may supply air to GPF 72 for regeneration. The other illustrated elements function in a similar or the same manner as the configuration of FIG. 11 and will not be discussed in further detail.

Figure 14:
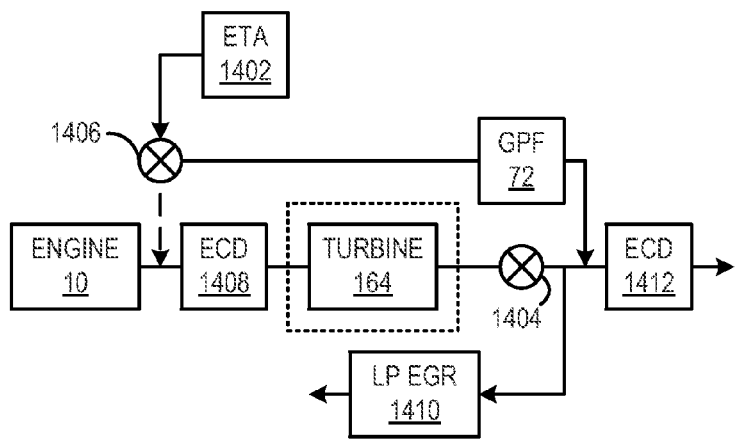
FIG. 14 is another embodiment of an exhaust system of an engine.

FIG. 14 shows another embodiment of an exhaust system of an engine that is configured similar to the exhaust system of FIG. 11. This embodiment further includes a port electric thermactor air (ETA) system 1402 that may supply air to GPF 72 for regeneration. The other illustrated elements function in a similar or the same manner as the configuration of FIG. 11 and will not be discussed in further detail.

Figure 15:
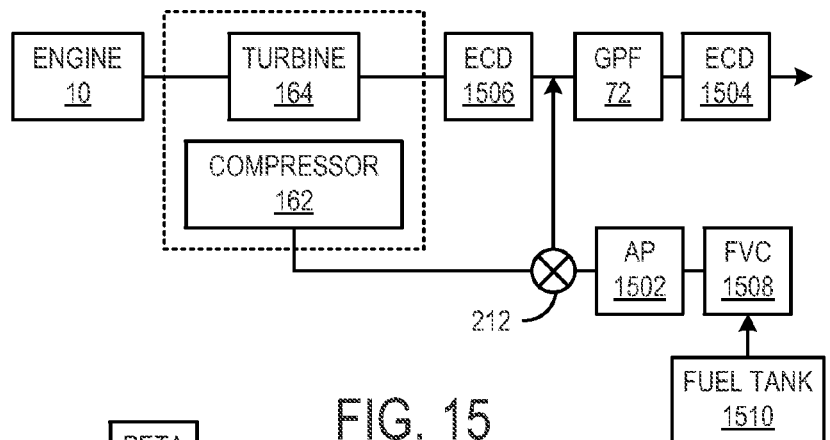
FIG. 15 is another embodiment of an exhaust system of an engine.

FIG. 15 shows another embodiment of an exhaust system of an engine. In the illustrated embodiment, GPF 72 may be positioned downstream of turbine 164 and emissions control device 1506. A lean air-fuel mixture may be supplied to the inlet of GPF 72 for regeneration from fuel vapor canister 1508 which collects fuel vapors from fuel tank 1510. In particular, air may be drawn from fuel vapor canister 1508 by air pump 1502 and/or compressor 162 and directed to the inlet of GPF 72 based on operation of bypass valve 212 such that air is supplied downstream of emissions control device 1506.

Figure 16:
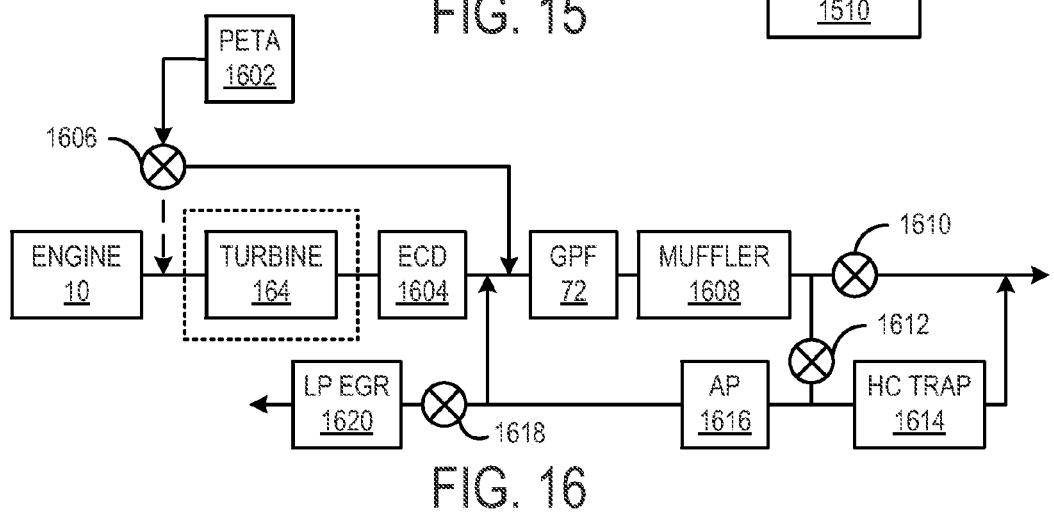
FIG. 16 is another embodiment of an exhaust system of an engine.

FIG. 16 shows another embodiment of an exhaust system of an engine. In the illustrated embodiment, GPF 72 may be positioned downstream of turbine 164 and emissions control device 1604 and upstream of muffler 1608. Further, hydrocarbon trap 1614 may be positioned downstream of GPF 72 and optionally may treat exhaust gas based on operation of valve 1610 and/or valve 1612. A variable flow purge pump 1616 may be positioned in parallel with GPF 72 and upstream from hydrocarbon trap 1614. Under some conditions, pump 1616 may be operated to draw air to the inlet of GPF 72. Further, the engine system may include a PETA system that may supply air to the inlet of GPF via operation of valve 1606, under some conditions. Valve 1606 may be a waste gate of a turbocharger that includes turbine 162. The waste gate may be opened during cold start conditions to supply air to GPF 72 for regeneration. Further, the engine system includes a low pressure EGR passage 1620. Under some conditions, air may be introduced to GPF 72 via low pressure EGR passage 1620. For example, when positive intake manifold pressure exists, air may be directed through low pressure EGR passage 1620 to GPF 72.

Figure 17:
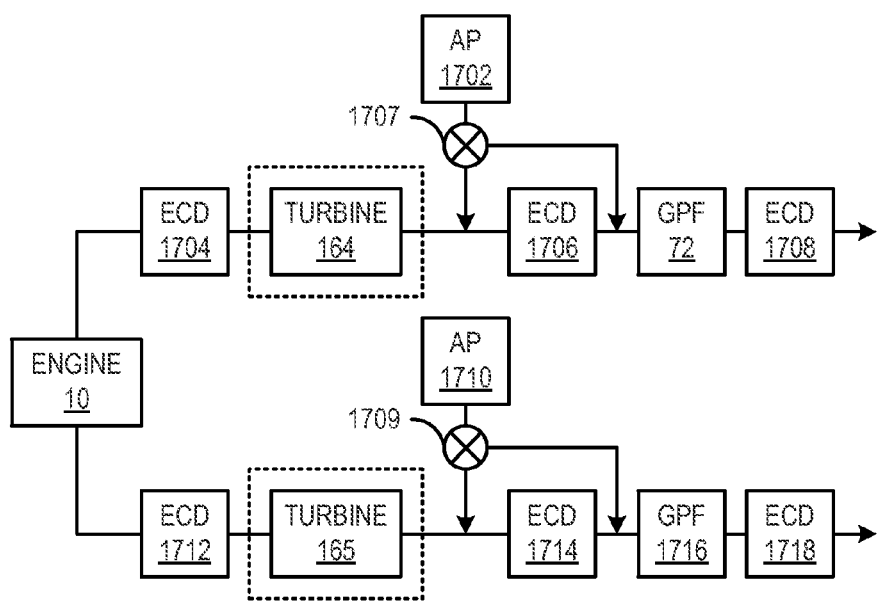
FIG. 17 is another embodiment of an exhaust system of an engine.

FIG. 17 shows another embodiment of an exhaust system of an engine. In the illustrated embodiment, engine 10 may be a V-type engine having separate exhaust systems for each engine bank. Further, the engine may include two turbochargers, one for each bank. Each exhaust system may include the same exhaust components. A first exhaust system may include GPF 72 positioned downstream of emissions control device 1704, turbine 164, and emissions control device 1706, and upstream of emissions control device 1708. A lean air-fuel mixture may be supplied from the outlet of turbine 164 to the inlet of GPF 72 while bypassing emissions control device 1706 based on operation of bypass valve 1707. Air pump 1702 may provide fresh air to the inlet of GPF 72 while bypassing emissions control device 1704, turbine 164, and emissions control device 1706 based on operation of bypass valve 1707.

Likewise, a second exhaust system may include GPF 1716 positioned downstream of emissions control device 1712, turbine 1658, and emissions control device 1714, and upstream of emissions control device 1718. A lean air-fuel mixture may be supplied from the outlet of turbine 165 to the inlet of GPF 1716 while bypassing emissions control device 1714 based on operation of bypass valve 1709. Air pump 1710 may provide fresh air to the inlet of GPF 72 while bypassing emissions control device 1712, turbine 165, and emissions control device 1714 based on operation of bypass valve 1707.

Figure 18:
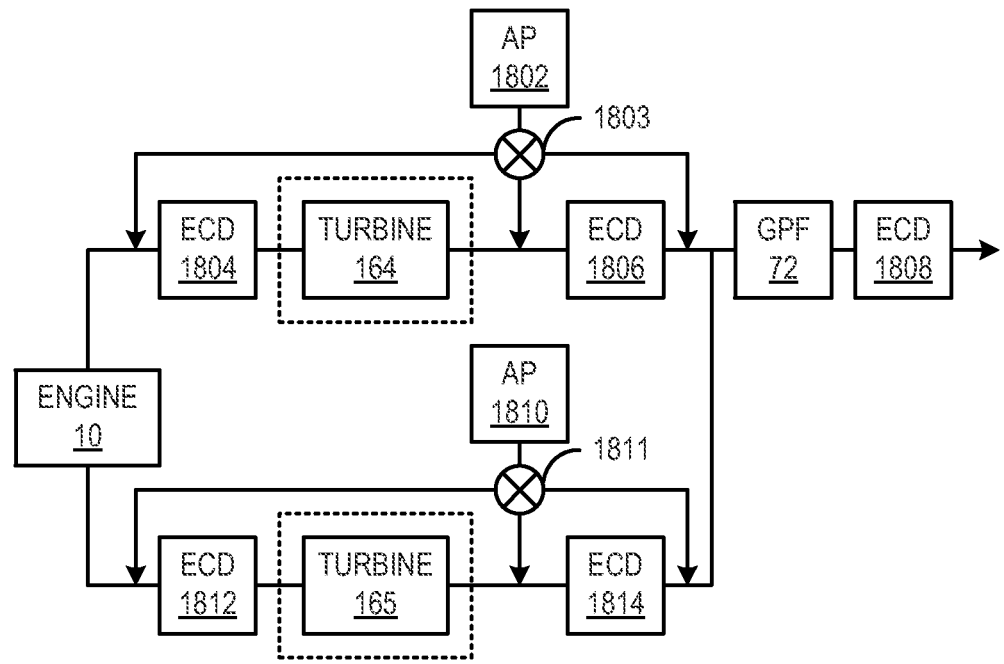
FIG. 18 is another embodiment of an exhaust system of an engine.

FIG. 18 shows another embodiment of an exhaust system for an engine. In the illustrated embodiment, engine 10 may be a V-type engine having separate exhaust systems for each engine bank that merge upstream of GPF 72 which is positioned upstream of emissions control device 1808. Further, the engine may include two turbochargers, one for each bank. Each exhaust system may include the same exhaust components. A first exhaust system may include emissions control device 1804, turbine 164, and emissions control device 1806 positioned upstream from GPF 72. A lean air-fuel mixture may be supplied from upstream of emissions control device 1804 or downstream of turbine 165 and upstream of emissions control device 1806 to the inlet of GPF 72 based on operation of bypass valve 1803. Further, fresh air may be supplied by air pump 1802 to the inlet of GPF 72 based on operation of bypass valve 1803. Likewise, a second exhaust system may include emissions control device 1812, turbine 165 and emissions control device 1814 positioned upstream from GPF 72. A lean air-fuel mixture may be supplied from upstream of emissions control device 1812 or downstream of turbine 165 and upstream of emissions control device 1814 to the inlet of GPF 72 based on operation of bypass valve 1811. Further, fresh air may be supplied by air pump 1810 to the inlet of GPF 72 based on operation of bypass valve 1811.

Figure 19:
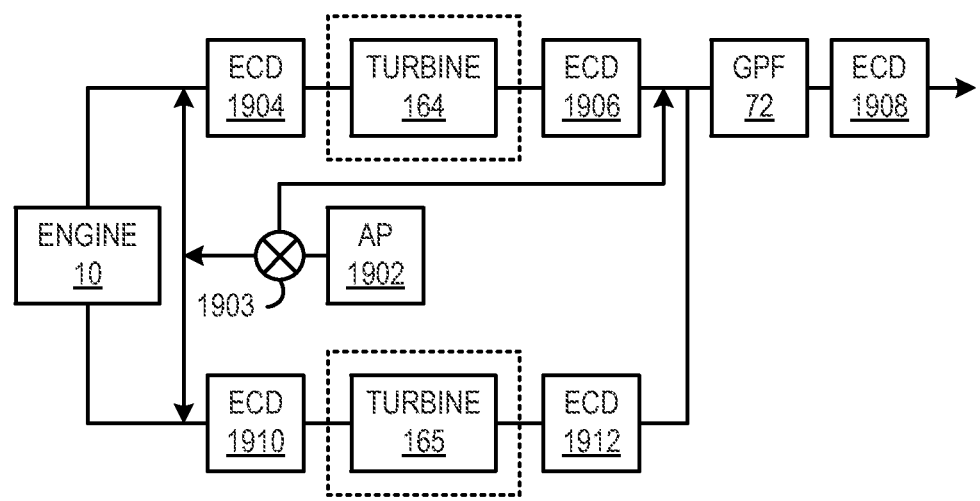
FIG. 19 is another embodiment of an exhaust system of an engine.

FIG. 19 shows another embodiment of an exhaust system of an engine. In the illustrated embodiment, engine 10 may be a V-type engine having separate exhaust systems for each engine bank that merge upstream of GPF 72 which is positioned upstream of emissions control device 1808. Further, the engine may include two turbochargers, one for each bank. Further still, one bypass valve/passage may facilitate bypass of emissions control devices in each exhaust system to reach the inlet of GPF 72. A first exhaust system may include emissions control device 1904, turbine 164, and emissions control device 1906 positioned upstream from GPF 72. Likewise, a second exhaust system may include emissions control device 1910, turbine 165, and emissions control device 1912 positioned upstream from GPF 72. A lean air-fuel mixture may be supplied from engine 10 to the inlet of GPF 72 while bypassing emissions control devices 1904, 1906, 1910, and 1912 based on operation of bypass valve 1903. Further, fresh air may be supplied by air pump 1902 to the inlet of GPF 72 based on operation of bypass valve 1903.

It will be appreciated that the above described exhaust system configurations are exemplary and other configuration may be implemented. Moreover, in some embodiments exhaust system components may be added or omitted to generate exhaust system configurations other than those described above.

FIGS. 20-22 show graphs that collectively illustrate the regeneration process of a GPF in an exhaust system of an engine of the present disclosure. FIG. 20 is a graph of a GPF temperature (in degrees Celsius) vs. time (in seconds). FIG. 21 is a graph of a gasoline particulate filter inlet air-fuel ratio (lambda) vs. time (in seconds). FIG. 22 is a graph of a gasoline particulate filter outlet air/filter ratio (lambda) vs. time (in seconds).

The configurations illustrated above enable various methods for performing regeneration of a GPF. Accordingly, some such methods are now described, by way of example, with continued reference to the above described configurations and graphs. It will be understood, however, that these methods, and others fully within the scope of the present disclosure, may be enabled via other configurations as well.

Figure 23:
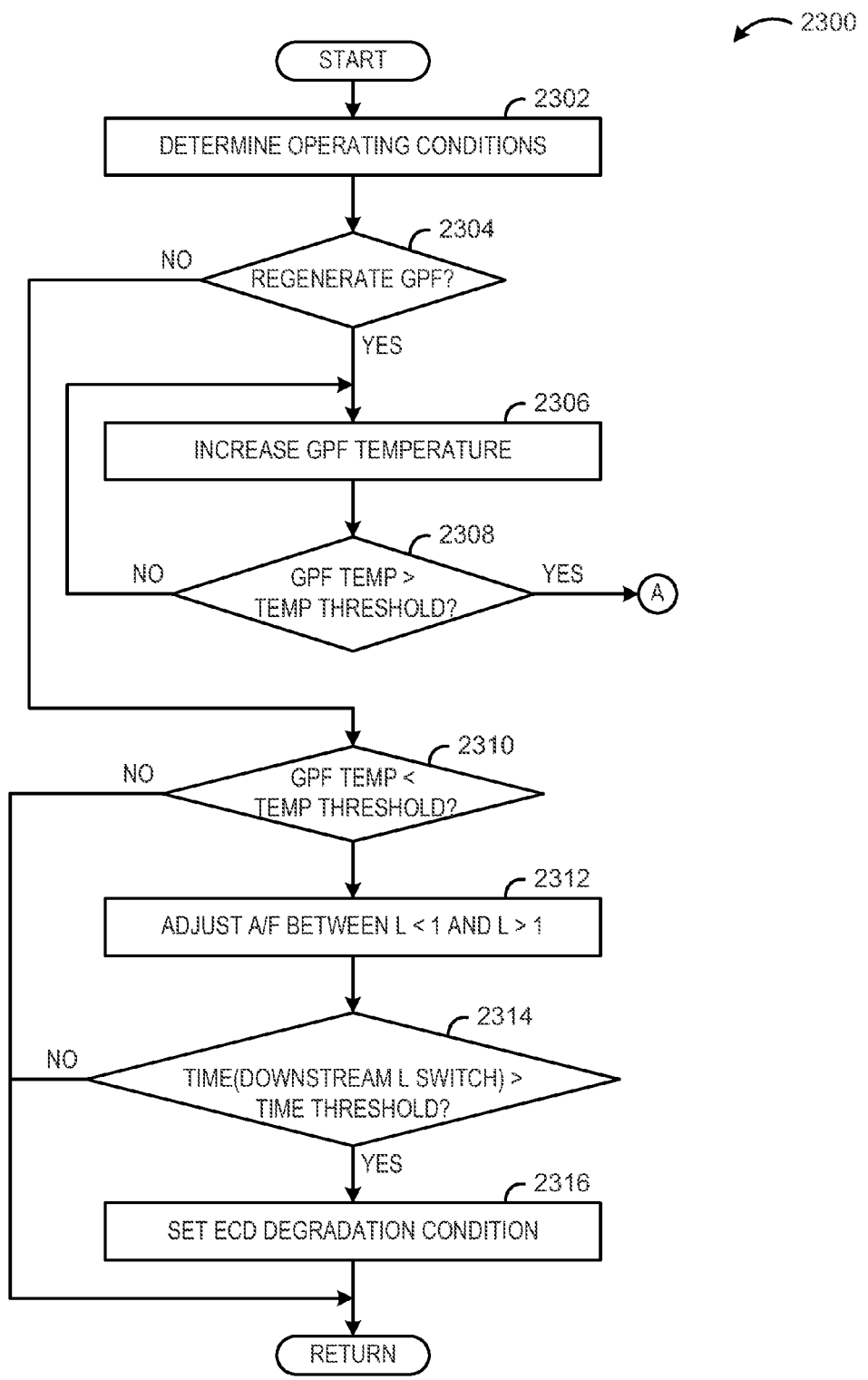
FIGS. 23-24 are a flow diagram of an embodiment of a method for regenerating a gasoline particulate filter.
Figure 24:
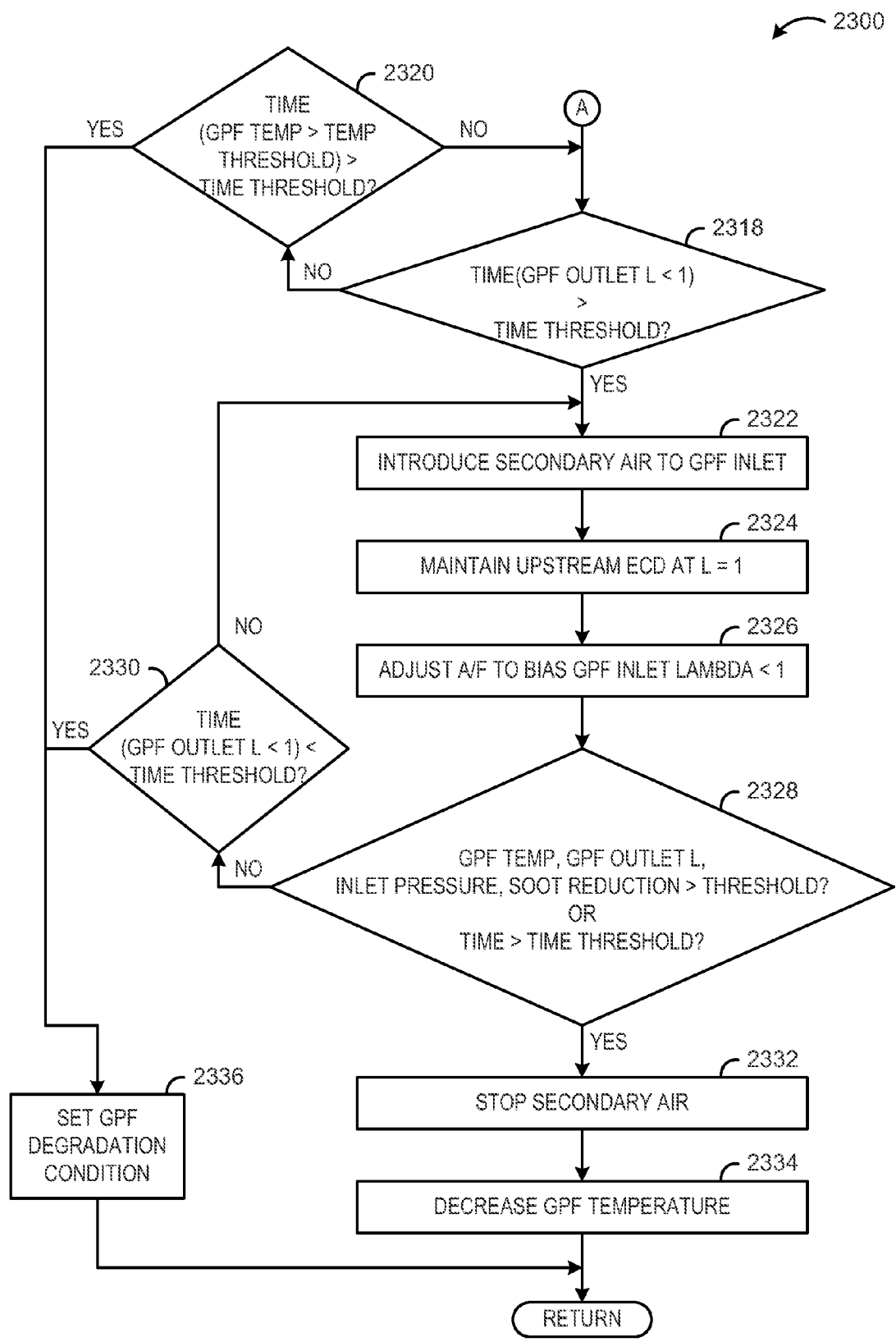

FIGS. 23-24 show a flow diagram of an embodiment of a method 2300 for regenerating a gasoline particulate filter. The method further may perform diagnostics on the gasoline particulate filter during regeneration and may perform diagnostics on an emission control device positioned upstream from the gasoline particulate filter when regeneration of the gasoline particulate filter is not being performed.

At 2302, the method may include determining engine operating conditions from sensors and actuators. In one example, GPF load, GPF temperature, GPF inlet air-fuel ratio, GPF outlet air-fuel ratio, engine feed-gas air-fuel ratio, the pressure drop across the GPF, air intake pressure, time since engine start, engine load, engine torque demand, engine speed, and amount of air inducted to the engine are determined. In other example embodiments, additional or fewer operating conditions may be determined based on specific objectives.

At 2304, the method may include determining whether or not to regenerate the GPF based on the operating conditions. For example, the determination to regenerate the GPF may be based on a pressure drop across the GPF. As another example, GPF regeneration may be determined based on a model. For example, a soot accumulation model that estimates the amount of soot produced by an engine may be the basis for regenerating a particulate filter. If the estimated amount of soot exceeds a soot threshold, particulate filter regeneration is initiated. On the other hand, if a pressure across the particulate filter is determined from a sensor or an estimating model, particulate filter regeneration may be initiated after the observed or estimated pressure exceeds a pressure threshold. As another example, GPF regeneration may be determined based on signals received from a soot sensor positioned downstream of the GPF.

In addition, other conditions may be included that determine when to regenerate the GPF. For example, filter regeneration may not proceed if engine temperature is above a temperature threshold or if engine temperature is below a temperature threshold. Further in one example, GPF regeneration may not proceed if GPF temperature is below a temperature threshold. In still another example, particulate filter regeneration may not proceed for a period of time since engine start. For example, particulate filter regeneration may not be initiated until enough time for engine speed to stabilize after engine start has passed. In another embodiment, particulate filter regeneration may be initiated during deceleration fuel shut-off. In yet another embodiment, particulate filter regeneration may not be initiated unless engine load is greater than a load threshold (for example, engine load may be the desired engine torque divided by total torque available from the engine; in other applications load may be the cylinder air charge divided by the total theoretical cylinder air charge), 0.3 load for example. If it is determined that the GPF is to be regenerated the method moves to 2306. Otherwise, the GPF is not to be regenerated and the method moves to 2310.

At 2306, the method may include increasing the GPF temperature. In one example, the GPF temperature is increased by retarding the spark timing of combustion, while maintaining combustion via air-fuel feedback control oscillating exhaust air-fuel between rich and lean stoichiometry. By retarding spark timing combustion may occur near or during exhaust valve opening so more heat generated during combustion may be transferred from the cylinder to the exhaust system to increase the exhaust temperature. Combustion may be controlled at stoichiometry or oscillated between lean and rich so as to not disturb operation of a feed-gass emissions control device positioned in the exhaust system upstream from the GPF. The GPF temperature increase may be ramped in order to inhibit thermal shock to the GPF so as not to cause degradation (e.g., cracking). For example, the GPF temperature may be ramped at a rate of approximately 1-10 degrees Celsius per second.

Referring to FIGS. 20-22, at 2002 the forced regeneration process is initiated as indicated by the increase in temperature. At 2004, the GPF temperature is shown ramping up to a temperature threshold. At 2102 and 2202, air-fuel feedback control of combustion at approximately stoichiometry is indicated by the rich/lean switching cycle. Initially, the oscillating exhaust air-fuel ratio entering the particulate filter generates air-fuel ratio oscillations downstream of the particulate filter.

At 2308, the method may include determining if the GPF temperature is greater than a temperature threshold. The temperature threshold may be set to any suitable temperature for soot combustion to occur. In one example, the temperature threshold is set to 600° C. If the GPF temperature is greater than the threshold temperature the method moves to 2310. Otherwise, the GPF temperature is not greater than threshold temperature and the method returns to 2306 to further increase the GPF temperature.

The GPF inlet and outlet lambda signals (the switching ratio) may be compared during the temperature ramp to assess the state of the GPF. At 2318, the method may include determining if the time that the GPF outlet lambda is continually biased rich is greater than a time threshold. In other words, it may be determined if the downstream oscillations in exhaust air-fuel ratio are sufficiently dissipated. Sufficient dissipation of the downstream oscillation may include when the downstream air-fuel ratio no longer switches between lean and rich even though the upstream air-fuel ratio continues to switch between lean and rich. The time threshold that the GPF is continually biased rich may be set to any suitable threshold to determine that particulate matter oxidation is occurring on the underbody of the GPF at the threshold temperature. If it is determined that the time that the GPF outlet lambda is continually biased rich is greater than the time threshold, the method moves to 2318. Otherwise, the time that the GPF outlet lambda is continually biased rich is not greater than the time threshold and the method moves to 2320.

At 2320, the method may include determining if the time that the GPF temperature is greater than the temperature threshold is greater than a time threshold. This determination may be used to test the functionality of the GPF. In other words, once the GPF reaches the temperature threshold at which soot oxidation occurs, a properly functioning GPF should produce an outlet lambda that is biased rich, so if the GPF outlet lambda is not biased rich when the time threshold at which the GPF temperature is at the threshold temperature has elapsed, the GPF is not functioning properly and the method moves to 2336. Otherwise, the time that the GPF temperature is at the temperature threshold is not greater than the time threshold and the method returns to 2318.

At 2322, it has been determined that the GPF temperature is at the threshold temperature and the GPF outlet lambda has become biased rich for a time threshold, as such, the method may include enleaning the exhaust air-fuel ratio entering the particulate filter. For example, enleaning may include introducing secondary air or fresh air between the emissions control device (e.g., three-way catalyst) and the inlet of the GPF. The addition of secondary air may provide oxygen to assist in particulate matter oxidation as well as to clean up any hydrocarbon and carbon monoxide slip in the GPF. The secondary air may be introduced downstream of the upstream emissions control device so as to not bias the upstream emissions control device to become lean and cause emissions slip.

As discussed above, secondary air may be introduced in a variety of ways accordingly system configuration and operation conditions. For example, introducing secondary air may include activating an air pump that pumps air into the GPF inlet. As another example, introducing secondary air may include directing air through a high pressure EGR passage and bypassing emission control devices upstream of the GPF via control of one or more valves. In another example, introducing secondary air may include directing air through a low pressure EGR passage. Under some conditions, Ram air may be used to introduce secondary air to the GPF inlet. The introduction of secondary air may cause an increase in the oxidation rate of soot in the GPF resulting in an increase in GPF regeneration efficiency and a decrease in GPF regeneration time.

At 2324, the method may include controlling air-fuel to maintain the outlet of an upstream or feed-gas emission control device at stoichiometric conditions. In other words, the method may include oscillating the exhaust air-fuel ratio entering the emissions control device. By operating at stoichiometry, the emissions control device may be brought to a light-off temperature quickly and may not be disturbed from processing engine feed-gas exhaust so as not to cause emissions slip.

At 2326, in some embodiments, the method may include controlling air-fuel to bias the GPF inlet rich to provide additional hydrocarbons to the GPF inlet to improve combustion of soot particulates when the secondary air is introduced. This operation may be performed in embodiments where the GPF includes a catalyzed layer.

Referring to FIGS. 20-22, at 2006 the GPF temperature has been increased to the temperature threshold at which soot particulates combust. Correspondingly, at 2204, the oscillations are sufficiently dissipated and the GPF outlet lambda has become biased rich for a time that is greater than a time threshold indicating soot combustion. Accordingly, enleaning of the exhaust air-fuel ration entering the particulate filter may be performed. For example, secondary air may be introduced to the GPF causing the GPF outlet lambda to be biased lean. As shown at 2104, in some cases, the GPF inlet lambda may be biased rich to improve soot oxidation during GPF regeneration.

At 2328, the method may include determining if the GPF temperature is greater than the threshold temperature and the GPF outlet lambda is greater than a lambda threshold. In some embodiments, it may be determined if the downstream air-fuel ratio rises above a threshold amount. The lambda threshold may be any suitable lambda value that is greater than one or biased lean. The increased temperature and the lean bias may indicate that the soot load of the GPF has been diminished and the GPF has been regenerated. Further, indication that regeneration is ending may include normalization of exhaust pressure before the GPF temperature begins to decrease. If it is determined that the GPF temperature is greater than the threshold temperature and the GPF outlet lambda is greater than the lambda threshold and the method moves to 2332. Otherwise, the GPF outlet lambda is not greater than the lambda threshold and the method moves to 2330.

In some cases, for example where the GPF is at partial load, at 2328 the method may include determining if a time since regeneration started is greater than a time threshold. The time threshold may be set to a duration that is based on the GPF soot load and/or a GPF regeneration model that provides an estimated time for regeneration. If the time is greater than the time threshold, the method moves to 2332. Otherwise, the time is not greater than the time threshold and the method moves to 2330.

At 2330, the method may include determining if the time at which the GPF outlet lambda is biased rich after secondary air is introduced is less than a time threshold. In other words, if the GPF outlet lambda is not lean long enough during regeneration, then it can be determined that the GPF did not store soot properly and is not functioning properly. In some cases, this determination may be performed based on the delta between an O2 sensor positioned upstream from the GPF and an O2 sensor positioned downstream of the GPF. If it is determined that the time at which the GPF outlet lambda biased rich after secondary air is introduced is less than the time threshold the method moves to 2336. Otherwise it is determined that the time at which the GPF outlet lambda is biased rich after secondary air is introduced is not less than the time threshold and the method returns to 2322.

At 2336, the method may include setting a GPF degradation condition. The GPF degradation condition may indicate that the GPF is no longer functioning properly. In some embodiments, setting the degradation condition may include triggering an on-board diagnostic (OBD) trouble code to alert a vehicle operator that the GPF needs to be replaced. In some embodiments, setting the GPF degradation condition may include adjusting and/or restricting vehicle operation.

At 2332, it has been determined that GPF regeneration is complete, thus, the method may include reducing the enleanment of the exhaust air-fuel ratio entering the particulate filter. For example, reducing the enleanment may include reducing or stopping the introduction of fresh or secondary air. For example, stopping secondary air injection may include stopping operation of an air pump or changing the state of valves associated with high pressure and/or low pressure EGR passages. At 2334, the method may include decreasing the GPF temperature and the method ends or returns to other operations. For example, decreasing the GPF temperature may include advancing spark timing.

Referring to FIGS. 20-22, at 2008, GPF regeneration has been stopped or completed and the decrease in the GPF temperature begins. Correspondingly, at 2206 the secondary air injection is stopped and the GPF outlet lambda enleanment is reduced. Also, at 2106 and 2208 GPF inlet lambda and GPF outlet lambda return to stoichiometric operation or oscillating between rich and lean.

Moving to 2310, it has been determined that the GPF regeneration is not occurring. Since GPF regeneration is not occurring, diagnostics may be performed on the upstream emissions control device (e.g., TWC) without interference from a secondary air injection which would occur during GPF regeneration. At 2310, the method may include determining if the GPF temperature is less than a temperature threshold. If the GPF temperature is less than the threshold temperature diagnostics may be performed on the upstream emissions control device without interference from the GPF, and the method moves to 2312. In particular, in embodiments where the GPF includes a catalyzed layer, an O2 sensor positioned downstream of the GPF that may be used for diagnostics may be affected by hot exhaust gas flowing from the GPF. Otherwise, the GPF temperature is not less than the threshold temperature and the GPF may interfere with diagnosis of the upstream emissions control device so diagnostics of the upstream emissions control device is not performed and the method ends or returns to other operations.

At 2312, the method may include adjusting air-fuel between rich and lean operation. This may include adjusting from rich to lean or rich to lean. This switch may be performed one or more times to increase a confidence level of the sensor readings.

At 2314, the method may include determining if the time for a downstream lambda reading to switch (lean to rich or rich to lean) is greater than a time threshold. If the time for the downstream lambda reading to switch is not greater than the time threshold the emission control device is not degraded and the method ends or returns to other operations. Otherwise, the time for the downstream lambda reading to switch is greater than the time threshold and the method moves to 2316.

At 2316, the method includes setting an emissions control device degradation condition. The emissions control device degradation condition may indicate that the emissions control device is no longer functioning properly. In some embodiments, setting the degradation condition may include triggering an OBD trouble code to alert a vehicle operator that the emissions control device needs to be replaced. In some embodiments, setting the emissions control device degradation condition may include adjusting or restricting vehicle operation.

The above method may be performed to control introduction of secondary air downstream of a feed-gas emissions control device at the inlet of a GPF for quick and efficient regeneration. In particular, by increasing the GPF temperature to induce soot oxidation and determining when the GPF is continually biased rich indicating soot oxidation has begun, secondary air may be introduced for GPF regeneration in an accurate manner. In this way, GPF regeneration efficiency may be increased and the time for GPF regeneration to take place may be decreased. Moreover, by controlling air-fuel at stoichiometry and introducing secondary air downstream of the feed-gas emissions control device, GPF regeneration may be performed without causing the feed-gas emissions control device to be biased lean. In this way, the GPF may be regenerated without causing emissions slip from the feed-gas emissions control device.

Furthermore, the above method may be performed to diagnose functionality of the GPF or the feed-gas emissions control device based on the operating conditions of the engine and exhaust system. In particular, GPF diagnostics may be performed during GPF regeneration and emissions control device diagnostics may be performed at times other than GPF regeneration since the introduction of secondary air during GPF regeneration may affect readings of a downstream O2 sensor used for emissions control device diagnostics. The emissions control device diagnostics may be particularly applicable to system configurations that include an O2 sensor upstream of the feed-gas emissions control device and an O2 sensor downstream of the GPF.

Figure 25:
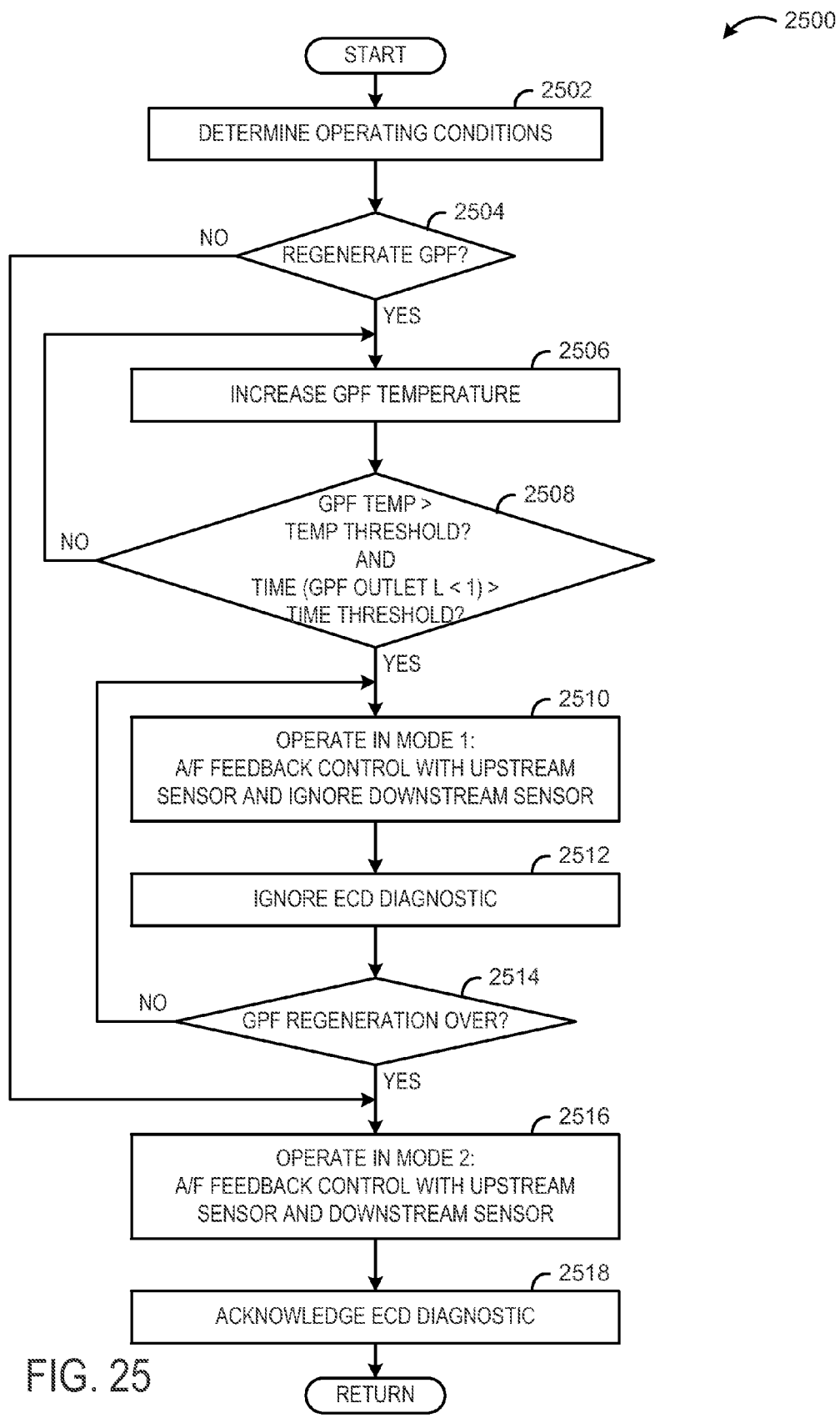
FIG. 25 is a flow diagram of an embodiment of a method for performing closed loop air-fuel feedback engine control based on regeneration of a gasoline particulate filter.

FIG. 25 shows a flow diagram of an embodiment of a method 2500 for controlling combustion while accounting for GPF regeneration via air-fuel feedback control. The method further may take into consideration GPF regeneration when performing emissions control device diagnostics. The method may be performed in a system that is configured with a first O2 sensor positioned upstream of an upstream emissions control device and a second O2 sensor positioned downstream of a GPF. At 2502, the method may include determining engine operating conditions from sensors and actuators.

At 2504, the method may include determining whether or not to regenerate the GPF based on the operating conditions. If it is determined that the GPF is to be regenerated the method moves to 2506. Otherwise, the GPF is not to be regenerated and the method moves to 2516.

At 2506, the method may include increasing the GPF temperature. In one example, the GPF temperature is increased by retarding the spark timing of combustion, while maintaining combustion at stoichiometry. The GPF temperature increase may be ramped in order to inhibit thermal shock to the GPF so as not to cause degradation (e.g., cracking).

At 2508, the method may include determining if the GPF temperature is greater than a temperature threshold and if a time that the GPF outlet lambda is less than one or biased rich is greater than a time threshold. This determination may indicate whether or not the GPF has reached a temperature suitable for soot oxidization to take place as indicated by the rich bias of the GPF outlet lambda. Moreover, the determination may indicate whether or not operating conditions are suitable for secondary air injection to aid in GPF regeneration. If the GPF temperature is greater than the threshold temperature and the time that the GPF outlet lambda is biased rich is greater than the time threshold the method moves to 2510. Otherwise, the GPF temperature is not greater than threshold temperature or the time that the GPF outlet lambda is biased rich is not greater than the time threshold and the method returns to 2506.

At 2510, the method may include operating in a first mode that includes adjusting air-fuel via closed loop feedback control based on signals from an O2 sensor positioned upstream from the GPF and not based on signals from an O2 sensor positioned downstream of the GPF. For example referring to FIG. 2, an exhaust system may include an upstream O2 sensor that is positioned upstream from GPF 72 and upstream from where secondary air is introduced, such as upstream from emissions control device 71. Further, the exhaust system may include a downstream O2 sensor that is positioned downstream from GPF 72. The air-fuel feedback control may be based on the upstream O2 sensor and not the downstream O2 sensor because the introduction of secondary air to aid in GPF regeneration may influence the readings of the downstream O2 sensor causing the readings to be less accurate under some conditions. Since the upstream O2 sensor is positioned upstream of the secondary air injection its readings are not affected by the introduction of secondary air.

At 2512, the method may include ignoring emission control device diagnostics. For example, referring to FIGS. 23-24, the emissions control device diagnostics performed at 2310-2316 may compare reading between the upstream O2 and the downstream O2 sensor. Since the downstream O2 sensor readings may be less accurate due to the introduction of secondary air during GPF regeneration, the emissions control device diagnostics may provide a false diagnosis of the upstream emissions control device. As such, the emissions control diagnostics are to be ignored. In some embodiments, ignoring the emissions control device diagnostics may include disabling the diagnostics during GPF regeneration. In some embodiments, the emissions control device diagnostics may be performed and the results of the diagnostics may be ignored.

At 2514, the method may include determining if GPF regeneration is over. For example, the determination may be made based on the temperature of the GPF, the GPF outlet lambda, stoppage of the introduction of secondary air, a time since GPF regeneration has begun relative to a time threshold, or a combination thereof. If it is determined that GPF regeneration is over the method moves to 2516. Otherwise, GPF regeneration is not over and the method returns to 2510.

At 2516, the method may include operating in a second mode that includes adjusting air-fuel via closed loop feedback control based on signals from an O2 sensor positioned upstream from the GPF and based on signals from an O2 sensor positioned downstream of the GPF. Since GPF regeneration is not occurring and secondary air is not being introduced both the upstream O2 sensor and the downstream O2 sensor may provide accurate readings that may be used for closed loop feedback air-fuel control.

At 2518, the method may include acknowledging emissions control device diagnostics. The upstream emissions control device diagnostics that are performed, such as for example, at 2310-2316 of method 2300 may compare the readings from the upstream O2 sensor and the downstream O2 sensor. Since both O2 sensors secondary air is not being introduced both O2 sensors may have suitably accurate readings that may be used to perform accurate diagnostics of the upstream O2 sensor.

By operating in a first mode of closed loop feedback air-fuel control that includes using reading from an upstream O2 sensor and not using readings from a downstream O2 sensor during GPF regeneration where secondary air is introduced to the GPF, accurate air-fuel control may be performed during GPF regeneration. Moreover, by operating in a second mode of closed loop feedback air-fuel control that includes using reading from an upstream O2 sensor and using reading from a downstream O2 sensor when secondary air is not being introduced to the GPF, air-fuel control having increased confidence may be performed using readings from both O2 sensors. In this way closed loop feedback air-fuel control may be made more robust.

Furthermore, by ignoring emissions control diagnostics during GPF regeneration, false diagnostic results that are caused by less accurate reading from an O2 sensor positioned downstream from the GPF may be avoided. In this way, emissions control device diagnostics may be made more robust.

In the above described methods, by introducing secondary air to a location in an exhaust system downstream of a catalyst and upstream of a particulate filter; soot held in the particulate filter may be oxidized without disturbing the processing of engine exhaust gases in an upstream catalyst. For example, during part-throttle conditions, engine feed gas emission consisting of HC, CO, and $NO_X$ can be converted to $N_2$, $CO_2$, and $H_2O$ by way of a three-way catalyst. However, these catalytic induced reactions are more efficient when engine feed gases are near stoichiometric conditions. In addition, soot accumulated in a particulate filter disposed in an exhaust system may be converted to $CO_2$ when sufficient oxygen and temperature are present at the particulate filter. Introducing oxygen from the intake system to a location in the exhaust system downstream of a catalyst and upstream of a particulate filter allows gases entering the catalyst to remain near stoichiometry, while also allowing oxygen to be present at the particulate filter.

The present description may provide several advantages. Specifically, the approach may improve engine emissions by allowing a catalyst to operate in an efficient operating window while at the same time regenerating a particulate filter. Further, the present method allows EGR to flow to the engine while a particulate filter is being regenerated. Further still, the rate or particulate matter oxidation can be regulated by controlling the flow between the intake system and the exhaust system from feedback output from an oxygen sensor located downstream of the particulate filter.

It will be understood that the example control and estimation methods and routines disclosed herein may be used with various system configurations. These routines may represent one or more different processing strategies such as eventdriven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used. In some embodiments, process steps may be used in different control method and routines other than those illustrated. For example, process steps used in method 2300 may be incorporated into method 2500 and vice versa.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An engine system comprising:
an engine configured to combust air and alcohol;
an exhaust system configured to receive exhaust from the engine, the exhaust system comprising:
an emissions control device;
a particulate filter positioned downstream from the emissions control device;
an oxygen sensor positioned downstream from the particulate filter; and
a temperature sensor configured to provide a temperature of the particulate filter; and
a controller configured to, during regeneration of the particulate filter, increase the temperature of the particulate filter, and in response to the temperature of the particulate filter provided from the temperature sensor being greater than a temperature threshold and a time that a lambda of the oxygen sensor is biased rich is greater than a time threshold, introduce secondary air to a location downstream from the emissions control device and upstream from the particulate filter.

2. The system of claim 1, further comprising:
an air pump; and
the controller being configured to introduce secondary air by operating the air pump to pump the secondary air to the location downstream from the emissions control device and upstream from the particulate filter.

3. The system of claim 1, further comprising:
a turbocharger including a turbine; and
the controller being configured to introduce secondary air by directing secondary air from an outlet of a compressor to the location downstream from the emissions control device and upstream from the particulate filter.

4. The system of claim 1, further comprising:
an exhaust gas recirculation passage in fluid communication with an inlet of the particulate filter; and
the controller being configured to introduce secondary air by directing the secondary air from the exhaust gas recirculation passage to the location downstream from the emissions control device and upstream from the particulate filter.

5. The system of claim 4, wherein the exhaust gas recirculation passage is a high pressure exhaust gas recirculation passage in fluid communication with an outlet of a compression device and the inlet of the particulate filter; and
the controller being configured to introduce secondary air by directing the secondary air from the outlet of the compression device through the high pressure exhaust gas recirculation passage to the location downstream from the emissions control device and upstream from the particulate filter.

6. The system of claim 4, wherein the exhaust gas recirculation passage is a low pressure exhaust gas recirculation passage in fluid communication with an air intake of the engine and the inlet of the particulate filter; and
the controller being configured to introduce secondary air by directing the secondary air from the air intake through the low pressure exhaust gas recirculation passage to the location downstream from the emissions control device and upstream from the particulate filter.

7. The system of claim 6, wherein the secondary air is directed through the low pressure exhaust gas recirculation passage via positive intake manifold air pressure.

8. The system of claim 1, wherein the controller is configured to stop introduction of the secondary air in response to the temperature of the particulate filter as provided by the temperature sensor being greater than the temperature threshold and the lambda of the oxygen sensor being greater than a lambda threshold.

9. The system of claim 1, wherein the controller is configured to stop introduction of secondary air in response to at least one of a time since particulate filter regeneration start being greater than a time threshold, a particulate filter inlet pressure being greater than a pressure threshold, and a soot level being greater than a soot reduction threshold.

10. The system of claim 1, wherein the controller is configured to increase the temperature of the particulate filter by retarding spark timing of the engine.

11. The system of claim 1, wherein the controller is configured to increase the temperature of the particulate filter by ramping up the temperature of the particulate filter at a rate of between 1 and 10 degrees Celsius per second.

12. A method, comprising:
regenerating a particulate filter of a spark-ignition engine having an exhaust system that includes the particulate filter, an emissions control device positioned upstream from the particulate filter, and a downstream oxygen sensor positioned downstream from the particulate filter, the regenerating including increasing a temperature of the particulate filter, in response to the temperature of the particulate filter being greater than a temperature threshold and rich bias of air-fuel ratio of the downstream oxygen sensor, introducing secondary air to a location downstream from the emissions control device and upstream from the particulate filter; and
in response to the temperature of the particulate filter being greater than the temperature threshold without the rich bias of air-fuel ratio of the downstream oxygen sensor, setting a particulate filter degradation condition.

13. The method of claim 12, wherein the exhaust system includes an upstream oxygen sensor positioned upstream from the emissions control device, the method further comprising:
during regeneration of the particulate filter, maintaining air-fuel at an inlet of the emissions control device with air-fuel oscillating between lean and rich stoichiometry based on closed loop feedback from the upstream oxygen sensor.

14. The method of claim 12, wherein introducing secondary air to an inlet of the particulate filter includes at least one of operating an air pump, and directing secondary air through an exhaust gas regeneration passage to the inlet of the particulate filter.

15. A method for operating a spark-ignition engine, comprising:
- flowing engine exhaust from a three-way catalyst to a particulate filter;
- oscillating an exhaust air-fuel ratio entering the particulate filter to generate air-fuel ratio oscillations downstream of the particulate filter, while increasing exhaust temperature;
- when the downstream oscillations are sufficiently dissipated, introducing fresh air between the three-way catalyst and the particulate filter; and
- reducing the enleanment when particulate filter temperature is above a threshold.

16. The method of claim 15, further comprising terminating enleanment when sufficient exhaust gas temperature loss has occurred.

17. The method of claim 15, wherein sufficient dissipation of the downstream oscillations include when a downstream air-fuel ratio no longer switches between lean and rich even though an upstream air-fuel ratio continues to switch between lean and rich.

\* \* \* \* \*